US011630972B2

(12) United States Patent
Chen et al.

(10) Patent No.: US 11,630,972 B2
(45) Date of Patent: Apr. 18, 2023

(54) ASSEMBLY BODY CHANGE DETECTION METHOD, DEVICE AND MEDIUM BASED ON ATTENTION MECHANISM

(71) Applicant: QINGDAO TECHNOLOGICAL UNIVERSITY, Shandong (CN)

(72) Inventors: Cheng Jun Chen, Shandong (CN); Chang Zhi Li, Shandong (CN); Dong Nian Li, Shandong (CN); Jun Hong, Shandong (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 58 days.

(21) Appl. No.: 17/342,592

(22) Filed: Jun. 9, 2021

(65) Prior Publication Data

US 2022/0358334 A1 Nov. 10, 2022

(30) Foreign Application Priority Data

May 10, 2021 (CN) .......................... 202110507300.9

(51) Int. Cl.
*G06K 9/62* (2022.01)
*G06V 20/64* (2022.01)

(52) U.S. Cl.
CPC ......... *G06K 9/6257* (2013.01); *G06K 9/6215* (2013.01); *G06K 9/6232* (2013.01); *G06K 9/6262* (2013.01); *G06V 20/647* (2022.01); *G06V 2201/06* (2022.01)

(58) Field of Classification Search
CPC .. G06K 9/6257; G06K 9/6215; G06K 9/6232; G06K 9/6262; G06V 20/647; G06V 2201/06

USPC ........................................................ 382/103
See application file for complete search history.

(56) References Cited

U.S. PATENT DOCUMENTS

| | | | |
|---|---|---|---|
| 10,452,960 B1* | 10/2019 | Li | G06V 10/56 |
| 2018/0174311 A1* | 6/2018 | Kluckner | G06K 9/6259 |
| 2020/0193206 A1* | 6/2020 | Turkelson | G06T 5/009 |
| 2021/0142497 A1* | 5/2021 | Pugh | G06T 7/90 |

* cited by examiner

*Primary Examiner* — Michael R Neff
(74) *Attorney, Agent, or Firm* — McClure, Qualey & Rodack, LLP

(57) ABSTRACT

An assembly change detection method based on attention mechanism, including: establishing a three-dimensional model of an assembly body, adding a tag to each part in the three-dimensional model, setting several assembly nodes, obtaining depth images of the three-dimensional model under each assembly node in different viewing angles, and obtaining a change tag image of a added part at each assembly node; selecting two depth images at front and back moments in different viewing angles as training samples; performing semantic fusion, feature extraction, attention mechanism processing and metric learning sequentially on the training samples, training a detection model, continuously selecting training samples to train the detection model, saving model parameters with optimal similarity during training, completing training; and obtaining depth images of successive assembly nodes during assembling the assembly body, inputting depth images into trained detection model, and outputting change image of added part of the assembly body during assembly.

13 Claims, 5 Drawing Sheets

Subsequent moment

Previous moment

Change image　　　　Change tag image

ASSEMBLY BODY CHANGE DETECTION METHOD, DEVICE AND MEDIUM BASED ON ATTENTION MECHANISM

FIELD OF THE INVENTION

The present invention relates to an assembly body multi-view change detection method based on an attention mechanism, belonging to the technical field of computer vision and intelligent manufacturing.

BACKGROUND OF THE INVENTION

Computer vision is of great significance to the upgrade of intelligent manufacturing industry, especially the emergence of deep learning networks has promoted the development of modern industry. In the process of large-scale customized production and assembly, continuous changes in product types will increase the difficulty in assembling products. In the assembly process of complex assembly body parts, if correct or un-correct assembly of the newly assembled parts is not detected in time, the quality and assembly efficiency of mechanical products will be affected. Therefore, during the assembly process of mechanical assembly bodies, the detection of new assembly parts in each assembly step from multiple perspectives will help to obtain relevant information of the mechanical assembly process, and find errors in time, thereby achieving rapid positioning of the errors, improving the production efficiency of mechanical products, guaranteeing the quality level of mechanical products, and having important research value for the intelligent detection of the assembly process of the mechanical assembly bodies.

Image change detection can determine the difference in image state based on two images at different times and different viewing angles. The image change detection is currently mainly used in satellite image and aerial image research, and has important practical value in agricultural survey, natural disaster detection, forest resource monitoring, etc. The traditional change detection method mainly includes three steps: 1) inputting two images that need to be detected and analyzed; 2) obtaining a difference image by using a difference operator or other methods; and 3) analyzing data difference of the difference image to obtain a change region. With regard to the traditional change detection method, the performance depends on the formation of the difference image, and the formation of the difference image has greater noise interference, so higher accuracy cannot be obtained.

At present, with the vigorous development of deep learning technology, deep learning has been introduced into change detection, and many change detection algorithms based on deep learning have been proposed and achieved good results. However, these methods mainly aim at the detection of changes in similar viewing angles between remote sensing satellite images and aerial images. At present, there are few researches on multi-view change detection of mechanical assembly bodies. This is mainly because, compared with satellite images, mechanical parts have the characteristics of complicated structures, severe occlusion, large changes in viewing angles, single color and texture information of parts, etc., it is difficult to detect changes in their assembly process, and there is a lack of corresponding data sets.

SUMMARY OF THE INVENTION

In order to solve the above-mentioned problems in the prior art, the present invention proposes an assembly change detection method, device and medium based on an attention mechanism, which can detect changes in the assembly process of an assembly body.

The technical solution of the present invention is as follows:

Technical solution one:

An assembly body change detection method based on an attention mechanism, including the following steps:

establishing a data set; establishing a three-dimensional model of an assembly body, adding a tag to each part in the three-dimensional model, determining several assembly nodes according to given assembly steps of the assembly body, performing imaging processing on the three-dimensional model under each assembly node to obtain depth images of the three-dimensional model under each assembly node in different viewing angles, and obtaining a change tag image of a newly added part at each assembly node according to the tag of the part;

training a detection model; selecting two depth images of the three-dimensional model of two successive adjacent assembly nodes in different viewing angles as training samples; performing semantic segmentation on the two depth images respectively to obtain semantic images, and performing pixel fusion on the two semantic images and the corresponding depth images to obtain two fusion images; performing feature extraction on the two fusion images respectively to obtain two corresponding initial feature pictures; collecting context information of the two initial feature pictures through the attention mechanism, and capturing global position dependencies of the initial feature pictures according to the context information to obtain two corresponding attention feature pictures; calculating a Euclidean distance between the two attention feature pictures, generating a feature distance picture, and outputting a change image according to the feature distance picture; defining a loss function to calculate a similarity between the change image and the change tag image, continuously selecting training samples to train the detection model, saving model parameters with the optimal similarity during the training process, and completing the training; and performing change detection; obtaining the depth images of the two successive assembly nodes in the assembly process of the assembly body to be detected, inputting the depth images into the trained detection model, and outputting the change image of the newly added part of the assembly body in the assembly process.

Further, in the step of performing feature extraction on the two fusion images to obtain two corresponding initial feature pictures, the feature extraction method is specifically as follows:

performing 3×3 convolution on the inputted fusion images, and extracting features of the inputted images by using four stages of a RepVGG classification network;

embedding the attention mechanism after each stage of the RepVGG classification network to obtain four groups of feature maps respectively, performing 1×1 convolution on the four groups of feature maps, and transforming channel sizes of the feature maps to P1 which is set as an average channel size of the first two groups of feature maps; and performing unified up-sampling on feature picture sizes of the last three stages of feature maps as feature picture sizes of the first stage, performing tandem fusion of channels on the four groups of feature pictures obtained, and performing 3×3 convolution and 1×1 convolution sequentially on the fused feature pictures to obtain the initial feature pictures.

Further, the attention mechanism embedded in the RepVGG classification network is the same as the attention mechanism used in the step of collecting context information of the two initial feature pictures, and the attention mechanism includes two stages:

in the first stage, while saving original feature information, collecting context information of the feature information in horizontal and vertical directions through a self-attention algorithm to obtain horizontal and vertical cross paths of the original feature information; and in the second stage, obtaining other context information from the horizontal and vertical cross paths through the self-attention algorithm again to obtain the global position dependencies of the feature pictures.

Further, the step of calculating a Euclidean distance between the two attention feature pictures, generating a feature distance picture, and outputting a change image according to the feature distance picture is specific as follows:

firstly, adjusting sizes of the two inputted attention feature pictures to the same sizes as the initial inputted depth images by bilinear interpolation;

calculating the Euclidean distance between the two attention feature pictures after the size adjustment, and generating the feature distance picture; and setting a change threshold according to the distance information in the feature distance picture, dividing a depth image region into a changed region and an unchanged region through the change threshold and the distance information, and outputting the change image of the subsequent assembly node relative to the previous assembly node accordingly.

Further, the loss function is specifically:

$$L = \frac{1}{2N}\sum_{n=1}^{N} yd^2 + (1-y)\max(\text{margin} - d, 0)^2;$$

where $d=\|a_n-b_n\|_2$ represents a Euclidean distance between mapping vectors of two training samples, y is a tag value obtained through the change tag image, y=1 represents similarity, y=0 represents dissimilarity, N is a number of pixels of the training samples, and margin is a threshold set artificially.

Technical solution two:

An assembly body change detection device based on an attention mechanism, including a memory, a processor, and a computer program stored in the memory and executable on the processor, characterized in that the processor executes the program to implement the assembly body change detection method based on an attention mechanism according to any embodiment of the present invention.

Technical solution three:

An assembly body change detection medium based on an attention mechanism, storing a computer program thereon, characterized in that the computer program is executed by a processor to implement the assembly body change detection method based on an attention mechanism according to any embodiment of the present invention.

The present invention has the following beneficial effects:

The present invention designs a detection model including a semantic fusion module, a feature extraction module, an attention module, and a metric learning module. The semantic fusion module is configured to fuse semantic images and depth images to obtain fusion images, thereby enriching image feature information; the feature extraction module extracts high-dimensional semantic information and low-dimensional spatial information of the fusion images to obtain initial feature pictures; the attention module quickly focuses on key information of a current task from the initial feature pictures, and then obtains final feature pictures; and the metric learning module calculates distances between features according to the feature information of the final feature pictures to obtain a change region, and outputs change images of successive assembly nodes of the assembly body through the change region, wherein the change images can be used for monitoring missing assembly, wrong assembly, and assembly steps in the assembly process of an assembly body.

DETAILED DESCRIPTION OF THE EMBODIMENTS

The present invention will be described in detail below with reference to the accompanying drawings and specific embodiments.

Embodiment 1

Figure 1:
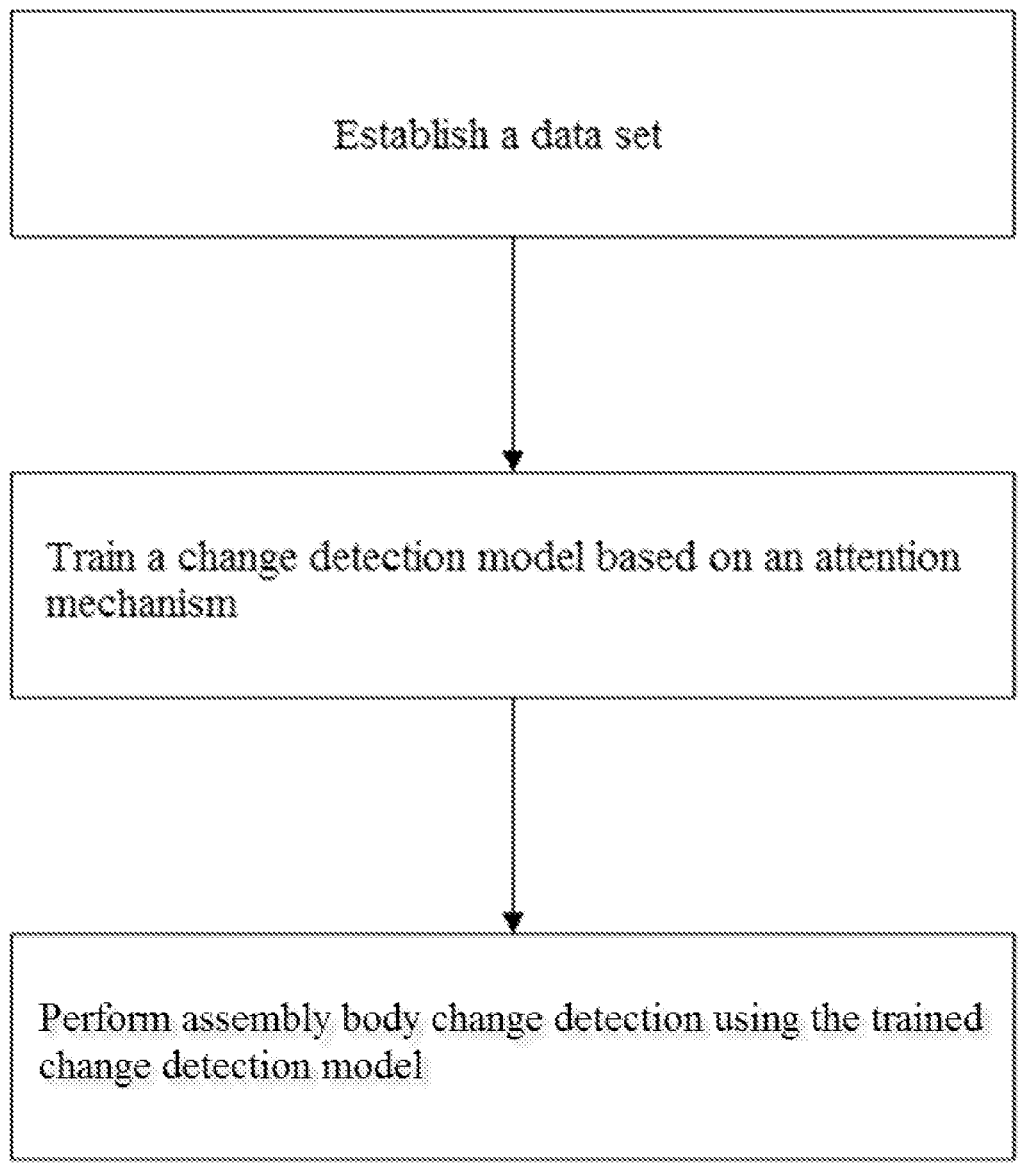
FIG. 1 is a flowchart of an embodiment of the present invention.
Figure 2:
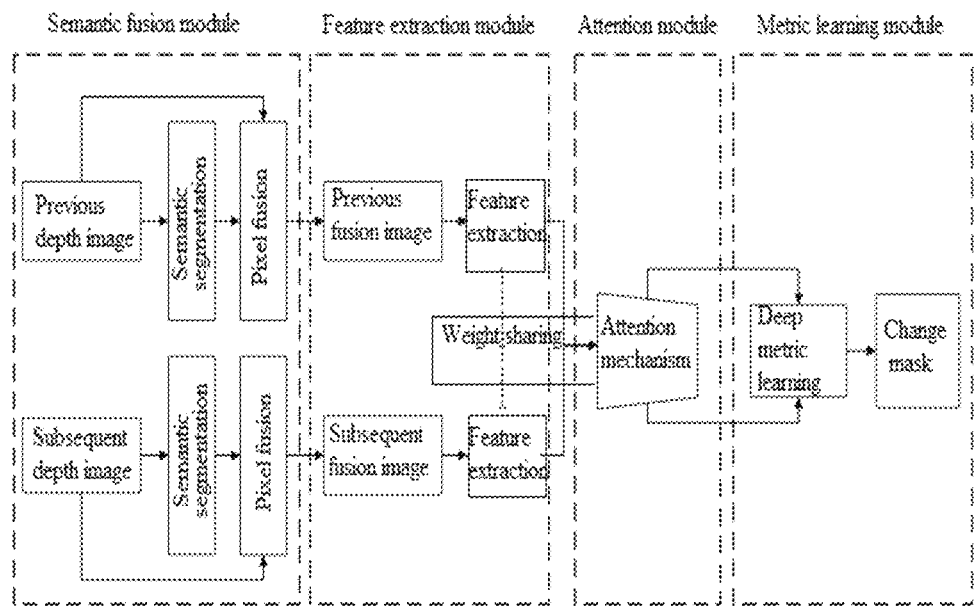
FIG. 2 is a schematic diagram of a detection model according to an embodiment of the present invention.

Referring to FIG. 1, an assembly body change detection method based on an attention mechanism includes the following steps:

Establishing a data set; establishing a three-dimensional model of a mechanical assembly body through SolidWorks software, and adding a tag to each part in the three-dimensional model, in this embodiment, the tags added to the parts being color marks, setting m assembly nodes and m-1 assembly steps, assembling one part in each step, then loading the three-dimensional model of the mechanical assembly body into depth image and color image formation software, setting a virtual camera to image different angles of each assembly node, obtaining depth images and color images of the three-dimensional model under each assembly node in different viewing angles, and generating a change tag image of a newly assembled part at each assembly node by using the color marks of the color images;

training a detection model; selecting the depth image of the three-dimensional model of the previous assembly node in one viewing angle and the depth images of the three-dimensional model of the subsequent assembly node in different viewing angles as a set of training samples;

referring to FIG. 2, in this embodiment, the detection model including four modules: a semantic fusion module, a feature extraction module, an attention module, and a metric learning module;

firstly, inputting Training samples to the semantic fusion module, the semantic fusion module including a semantic segmentation network and a pixel fusion network, first performing semantic segmentation on two depth images through the semantic segmentation network to obtain two corresponding semantic images, and then performing pixel fusion on the two semantic images with their corresponding depth images through the pixel fusion network to obtain two fusion images, in this embodiment, the semantic segmentation network (e.g., FCN, U-Net, etc.) configured to segment assembly parts, and input depth images in different viewing angles to the semantic segmentation network to obtain semantic images. The pixel fusion network fuses the semantic images and the depth images according to a certain pixel ratio by using a pixel-level image fusion method, thereby saving depth information as much as possible while fusing the semantic information, and increasing the amount of image feature information.

The feature extraction module performs feature extraction on the two fusion images respectively. In this embodiment, a multi-scale feature extraction and fusion mechanism is designed to fuse high-dimensional semantic information and low-dimensional spatial information, thereby increasing the amount of feature information and obtaining two corresponding initial feature picture;

collecting context information of the two initial feature pictures respectively by using the attention mechanism, and capturing global position dependencies of the initial feature pictures according to the context information by the attention module to obtain two corresponding attention feature pictures;

by the metric module, firstly, calculating a Euclidean distance between the two attention feature pictures and generating a feature distance picture, and outputting a change image according to the feature distance picture; defining a loss function to calculate a similarity between the change image and the change tag image of the subsequent assembly node, continuously selecting training samples to train the detection model, saving model parameters with the optimal similarity during the training process, and completing the training;

performing change detection; obtaining depth images of two successive assembly nodes in the assembly process of the assembly body to be detected, and inputing depth images into the trained detection model to output the change image of the newly added part of the assembly body in the assembly process.

In this embodiment, a detection model is designed to include a semantic fusion module, a feature extraction module, an attention module, and a metric learning module. The semantic fusion module is configured to fuse semantic images and depth images to obtain fusion images, thereby enriching image feature information; the feature extraction module extracts high-dimensional semantic information and low-dimensional spatial information of the fusion images to obtain initial feature pictures; the attention module quickly focuses on key information of a current task from the initial feature pictures to obtain final feature pictures; and the metric learning module calculates distances between features according to the feature information of the final feature pictures to obtain a change region, and outputs change images of successive assembly nodes of the assembly through the change region, monitoring missing assembly, wrong assembly, and whether the assembly steps are correct during the assembly process of an assembly body by using the change images.

Embodiment 2

Figure 3:
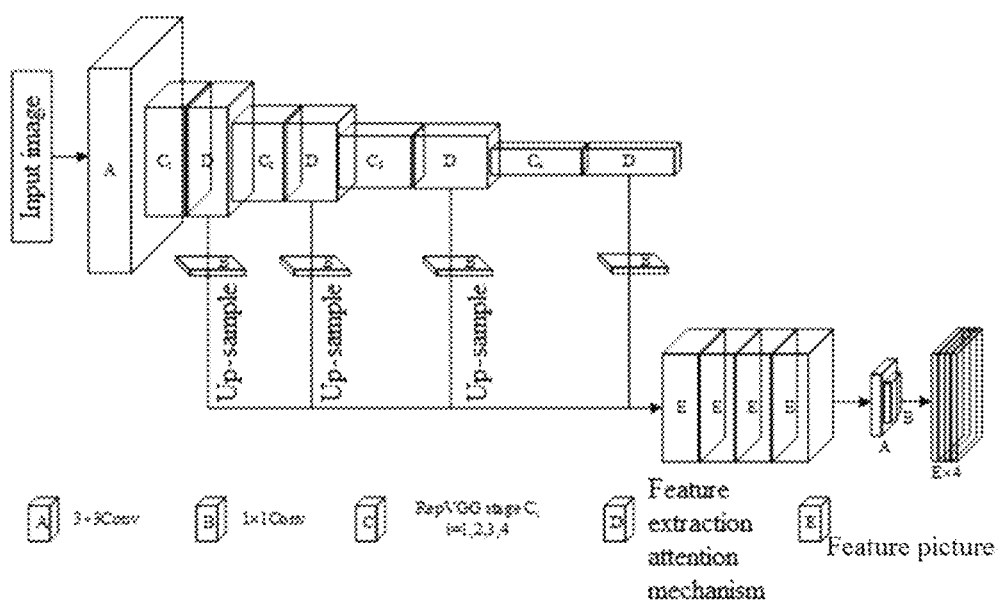
FIG. 3 is an illustrative diagram of a feature extraction module according to an embodiment of the present invention.

Referring to FIG. 3, this embodiment proposes a specific implementation of the feature extraction module:

firstly, performing 3×3 convolution on the inputted fusion images, and extracting features of the inputted images by using four stages of a RepVGG classification network;

embedding the attention mechanism after each stage of the RepVGG classification network to obtain four groups of feature maps respectively, performing 1×1 convolution on the four groups of feature maps, and then transforming channel sizes of the feature maps to P1 which is set as an average channel size of the first two groups of feature maps;

performing unified up-sampling on feature picture sizes of the last three stages of feature maps as feature picture sizes of the first stage, performing tandem fusion of channels on the four groups of feature pictures obtained, and performing 3×3 convolution and 1×1 convolution sequentially on the fused feature pictures to obtain the initial feature pictures. Due to adopting the multi-scale feature fusion mechanism, the fused feature pictures have a large amount of information, which is not conducive to the improvement of module speed and accuracy. The two convolutional layers can effectively reduce channel dimensions and make full use of the fused feature information to generate more distinguishing feature quantities.

Figure 4:
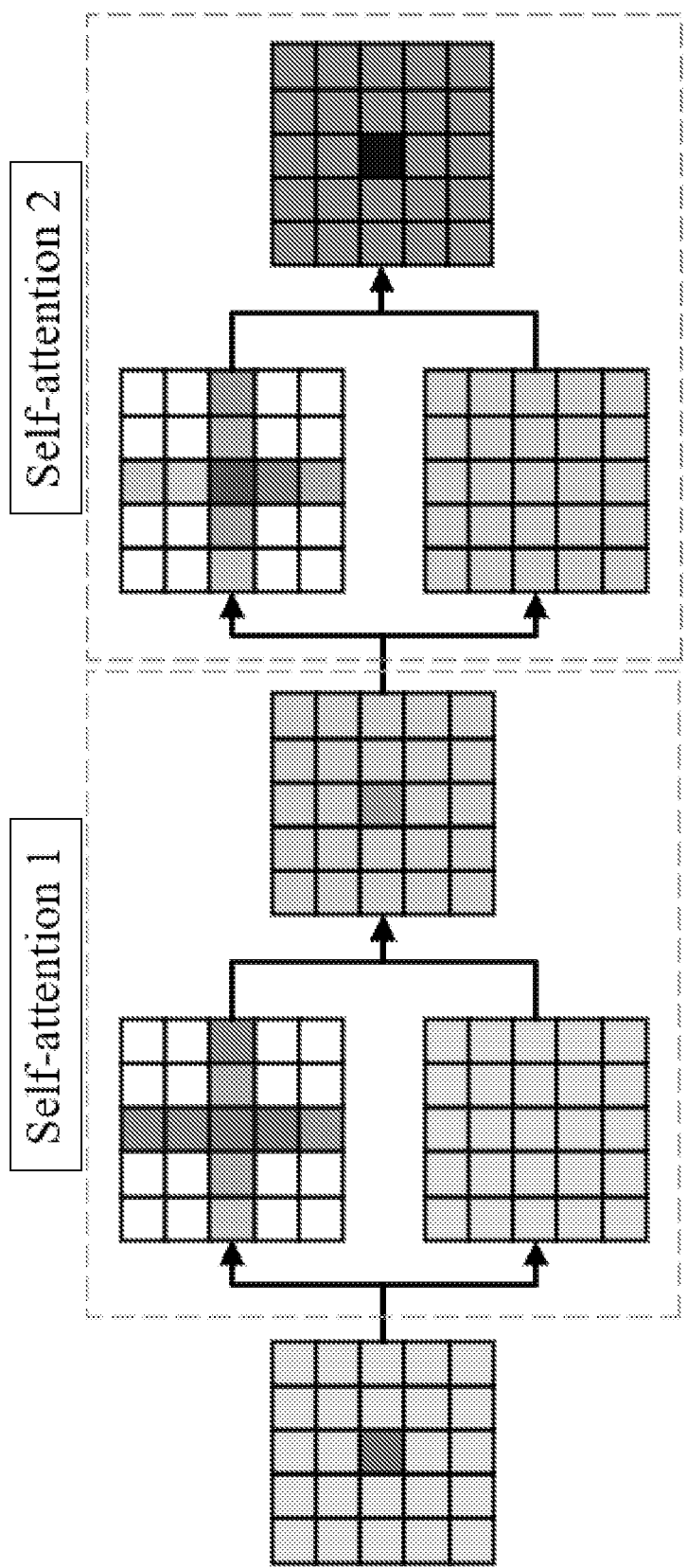
FIG. 4 is an illustrative diagram of an attention module according to an embodiment of the present invention.

Further, referring to FIG. 4, the attention mechanism embedded in the RepVGG classification network is the same as the attention mechanism used by the attention module. This embodiment proposes a specific implementation of the attention mechanism. The mechanism includes two stages:

in the first stage Self-attention 1, while original feature information is saved, context information of the feature information in horizontal and vertical directions is collected through a Self-attention algorithm to obtain initial attention feature pictures including horizontal and vertical cross paths of the original feature information;

in the second stage Self-attention 2, the generated initial attention feature pictures are fed to Self-attention 2, and other context information is obtained from the horizontal and vertical cross paths through the Self-attention algorithm again to obtain global position dependencies of the feature pictures. The parameter value of each feature vector is shared in the Self-attention 1 stage and the Self-attention 2 stage. The global position dependencies can be captured by only two times of Self-attention algorithm, and information can be collected from all pixels for each position in the attention feature picture finally outputted. The attention module helps to quickly focus on key information of a current task in mass inputted information, reduce irrelevant information, and significantly improve the processing efficiency and accuracy of the task.

Further, this embodiment proposes a specific implementation of the metric learning module:

this module learns nonlinear transformation from inputted data to a mapping space, mapping vectors of similar samples tend to be closer, and mapping vectors of different samples tend to be far away from each other. This, this patent uses a contrast loss function to define a smaller distance and a larger distance of mapping vectors to realize each change in the mapping space. The contrast loss function L is:

$$L = \frac{1}{2N}\sum_{n=1}^{N} yd^2 + (1-y)\max(\text{margin}-d, 0)^2 \qquad (1)$$

Where $d=\|a_n-b_n\|_2$ represents a Euclidean distance between two sample mapping vectors, y is a tag value obtained through the change tag image, y=1 represents that pixel values of pixels corresponding to the predicted change image and the real change tag image are similar or match, y=0 represents mismatch, N is a number of pixels of the training samples, and margin is a set threshold, which is set to 1 here. The loss function can be understood as two steps. The first step is to calculate distance information of two training samples, that is, feature difference information of two successive images. The second step is to compare the actual difference information between the predicted change image and the real change tag image according to the difference information.

During the specific process, dual-phase feature images at different times and different viewing angles are first given, and the size of each feature picture is adjusted to the same size as the inputted image by bilinear interpolation. Then the Euclidean distance between the feature pictures after the size adjustment is calculated to generate a feature distance picture $D \in R^{W_0 \times H_0}$, where $W_0$ and $H_0$ are respectively the height and width of the inputted image. In the training stage, network parameters are learned and continuously updated through the comparison loss function defined above, a change mask is generated, and the optimal module is saved. In the testing stage, a change region B is obtained according to the optimal model saved by the training network by setting a fixed threshold:

$$B_{i,j} = \begin{cases} 1 & D_{i,j} > \theta \\ 0 & \text{else} \end{cases} \quad (2)$$

Where $i,j (1 \leq i \leq W_0, 1 \leq j \leq H_0)$ represent width and height indexes of the feature distance picture D, and $\theta$ is a fixed threshold set for a separation change region, which is set to 1, here.

Figure 5:
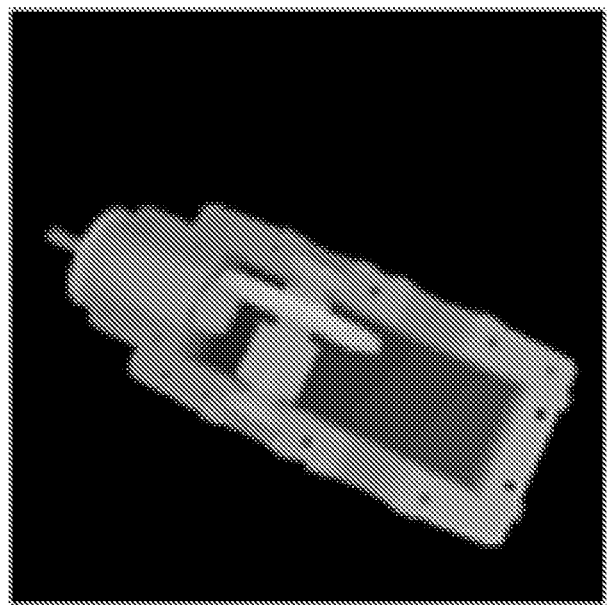
FIG. 5 is an illustrative diagram of training samples according to an embodiment of the present invention.
Figure 5:
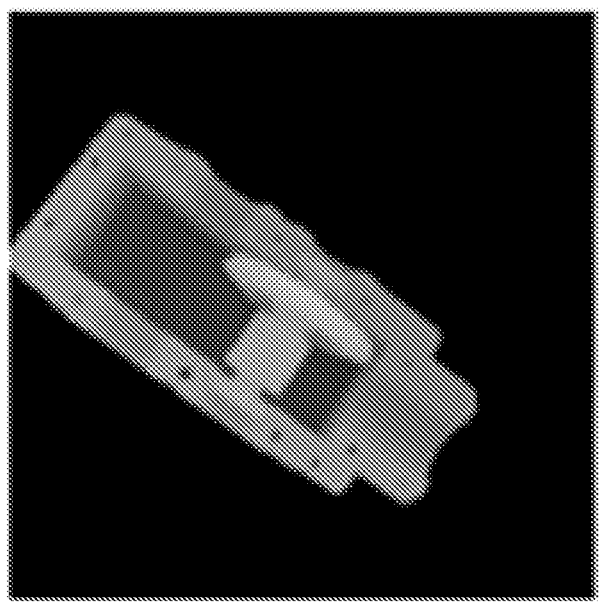
Figure 6:
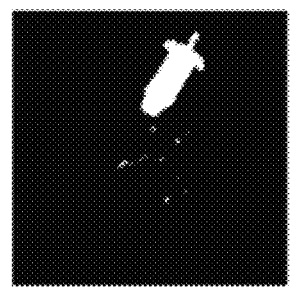
FIG. 6 is an illustrative diagram of a change image outputted by the model and a real change tag image according to an embodiment of the present invention.
Figure 6:
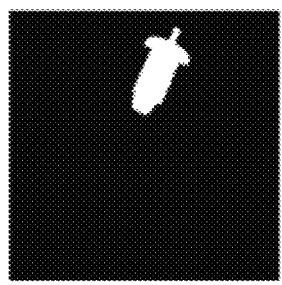

A scene change image of the assembly process is outputted based on the change region B. As shown in FIG. 5 and FIG. 6, FIG. 5 shows a set of training samples, that is, an illustrative diagram of depth images of two adjacent assembly nodes of the three-dimensional model of the assembly body at the front and back moments; in FIG. 6, the left is a change image outputted according to the two depth images in FIG. 5, and the right is an actual change tag image obtained according to the assembly nodes; a similarity is calculated through the loss function, and training samples are continuously selected for iterative training of the model, so that the change image outputted by the model gradually matches the change tag image.

Embodiment 3

An assembly body change detection device based on an attention mechanism includes a memory, a processor, and a computer program stored in the memory and executable on the processor, characterized in that the processor executes the program to implement the assembly body change detection method based on an attention mechanism according to any embodiment of the present invention.

Embodiment 4

An assembly body change detection medium based on an attention mechanism stores a computer program thereon, characterized in that the computer program is executed by a processor to implement the assembly body change detection method based on an attention mechanism according to any embodiment of the present invention.

The foregoing descriptions are merely embodiments of the present invention, and do not limit the patent scope of the present invention. Any equivalent structure or equivalent process transformation using the description of the present invention and the accompanying drawings, or directly or indirectly applied to other related technologies shall fall within the protection scope of the present invention.

The invention claim is:

1. An assembly body change detection method based on an attention mechanism, characterized by comprising the following steps:

establishing a data set; establishing a three-dimensional model of an assembly body, adding a tag to each part in the three-dimensional model, determining several assembly nodes according to given assembly steps of the assembly body, performing imaging processing on the three-dimensional model under each assembly node to obtain depth images of the three-dimensional model under each assembly node in different viewing angles, and obtaining a change tag image of a newly added part at each assembly node according to the tag of the part;

training a detection model; selecting two depth images of the three-dimensional model of two successive adjacent assembly nodes in different viewing angles as training samples; performing semantic segmentation on the two depth images respectively to obtain semantic images, and performing pixel fusion on the two semantic images and the corresponding depth images to obtain two fusion images; performing feature extraction on the two fusion images respectively to obtain two corresponding initial feature pictures; collecting context information of the two initial feature pictures through the attention mechanism, and capturing global position dependencies of the initial feature pictures according to the context information to obtain two corresponding attention feature pictures; calculating a Euclidean distance between the two attention feature pictures, generating a feature distance picture, and outputting a change image according to the feature distance picture; defining a loss function to calculate a similarity between the change image and the change tag image, continuously selecting training samples to train the detection model, saving model parameters with the optimal similarity during the training process, and completing the training; and performing change detection; obtaining the depth images of the two successive assembly nodes in the assembly process of the assembly body to be detected, inputting the depth images into the trained detection model, and outputting the change image of the newly added part of the assembly body in the assembly process.

2. The assembly body change detection method based on an attention mechanism according to claim 1, characterized in that in the step of performing feature extraction on the two fusion images to obtain two corresponding initial feature maps, the feature extraction method is specifically as follows:

performing 3×3 convolution on the inputted fusion images, and extracting features of the inputted images by using four stages of a RepVGG classification network;

embedding the attention mechanism after each stage of the RepVGG classification network to obtain four groups of feature maps respectively, performing 1×1 convolution on the four groups of feature maps, and transforming channel sizes of the feature maps to P1 which is set as an average channel size of the first two groups of feature maps; and performing unified up-sampling on feature picture sizes of the last three stages of feature maps as feature picture sizes of the first stage, performing tandem fusion of channels on the four groups of feature pictures obtained, and performing 3×3 convolution and 1×1 convolution sequentially on the fused feature maps to obtain the initial feature pictures.

3. The assembly body change detection method based on an attention mechanism according to claim 2, characterized in that the attention mechanism embedded in the RepVGG classification network is the same as the attention mechanism used in the step of collecting context information of the two initial feature maps, and the attention mechanism comprises two stages:

in the first stage, while saving original feature information, collecting context information of the feature information in horizontal and vertical directions through a self-attention algorithm to obtain horizontal and vertical cross paths of the original feature information; and in the second stage, obtaining other context information from the horizontal and vertical cross paths through the self-attention algorithm again to obtain the global position dependencies of the feature pictures.

4. The assembly body change detection method based on an attention mechanism according to claim 1, characterized in that the specific step of calculating a Euclidean distance between the two attention feature pictures, generating a feature distance picture, and outputting a change image according to the feature distance picture is specifically as follows:

first, adjusting sizes of the two inputted attention feature pictures to the same sizes as the initial inputted depth images by bilinear interpolation;

calculating the Euclidean distance between the two attention feature pictures after the size adjustment, and generating the feature distance picture; and setting a change threshold according to the distance information in the feature distance picture, dividing a depth image region into a changed region and an unchanged region through the change threshold and the distance information, and outputting the change image of the subsequent assembly node relative to the previous assembly node accordingly.

5. The assembly body change detection method based on an attention mechanism according to claim 1, characterized the loss function is specifically:

$$L = \frac{1}{2N}\sum_{n=1}^{N} yd^2 + (1-y)\max(\text{margin} - d, 0)^2;$$

where $d=\|a_n-b_n\|_2$ represents a Euclidean distance between mapping vectors of two training samples, y is a tag value obtained through the change tag image, y=1 represents similarity, y=0 represents dissimilarity, N is the quantity of pixels of the training samples, and margin is a threshold set artificially.

6. An assembly body change detection device based on an attention mechanism, comprising a memory, a processor, and a computer program stored in the memory and executable on the processor, characterized in that the processor executes the program to implement the assembly body change detection method based on an attention mechanism according to claim 1.

7. An assembly body change detection device based on an attention mechanism, comprising a memory, a processor, and a computer program stored in the memory and executable on the processor, characterized in that the processor executes the program to implement the assembly body change detection method based on an attention mechanism according to claim 2.

8. An assembly body change detection device based on an attention mechanism, comprising a memory, a processor, and a computer program stored in the memory and executable on the processor, characterized in that the processor executes the program to implement the assembly body change detection method based on an attention mechanism according to claim 3.

9. An assembly body change detection device based on an attention mechanism, comprising a memory, a processor, and a computer program stored in the memory and executable on the processor, characterized in that the processor executes the program to implement the assembly body change detection method based on an attention mechanism according to claim 4.

10. An assembly body change detection device based on an attention mechanism, comprising a memory, a processor, and a computer program stored in the memory and executable on the processor, characterized in that the processor executes the program to implement the assembly body change detection method based on an attention mechanism according to claim 5.

11. An assembly body change detection device based on an attention mechanism, comprising a memory, a processor, and a computer program stored in the memory and executable on the processor, characterized in that the processor executes the program to implement the assembly body change detection method based on an attention mechanism according to claim 3.

12. An assembly body change detection device based on an attention mechanism, comprising a memory, a processor, and a computer program stored in the memory and executable on the processor, characterized in that the processor executes the program to implement the assembly body change detection method based on an attention mechanism according to claim 4.

13. An assembly body change detection device based on an attention mechanism, comprising a memory, a processor, and a computer program stored in the memory and executable on the processor, characterized in that the processor executes the program to implement the assembly body change detection method based on an attention mechanism according to claim 5.

* * * * *